No. 726,965. PATENTED MAY 5, 1903.
W. H. MILLER & A. N. PIERMAN.
PROCESS OF MAKING SOUND RECORDS OR BLANKS.
APPLICATION FILED NOV. 21, 1902.
NO MODEL.
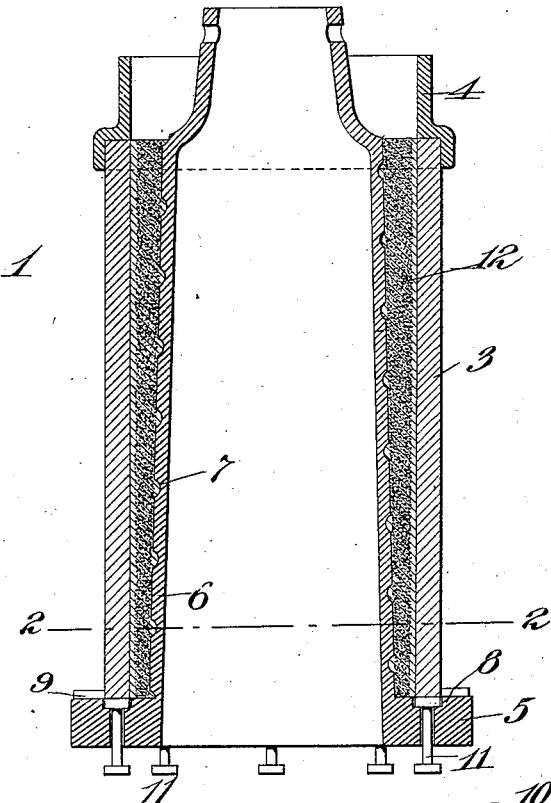
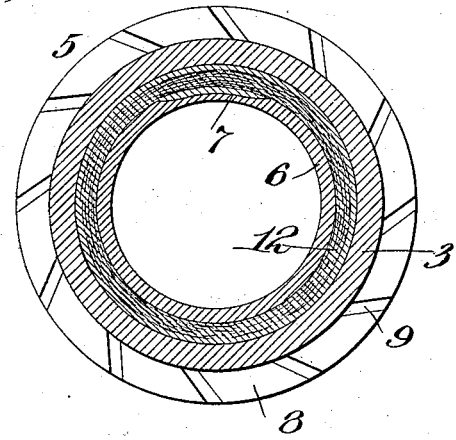
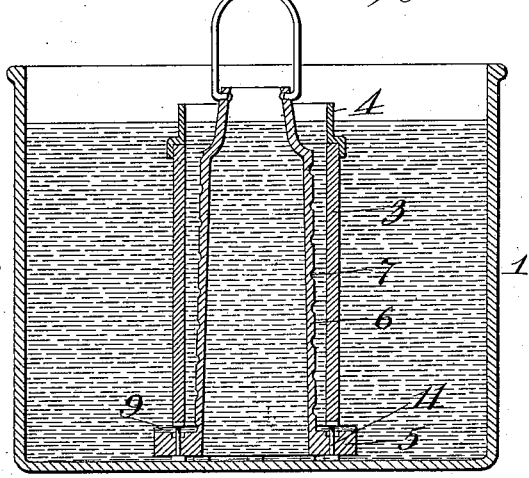
Witnesses:
Jas. F. Coleman
Jno. Robt Taylor
Inventors
Walter H. Miller
Alexander N. Pierman
by Ayer Edmonds Ayer
Attorneys No. 726,965. Patented May 5, 1903.

UNITED STATES PATENT OFFICE.

WALTER H. MILLER, OF ORANGE, AND ALEXANDER N. PIERMAN, OF NEWARK, NEW JERSEY, ASSIGNORS TO NATIONAL PHONOGRAPH COMPANY, OF ORANGE, NEW JERSEY, A CORPORATION OF NEW JERSEY.

PROCESS OF MAKING SOUND RECORDS OR BLANKS.

SPECIFICATION forming part of Letters Patent No. 726,965, dated May 5, 1903.

Application filed November 21, 1902. Serial No. 132,218. (No specimens.)

*To all whom it may concern:*

Be it known that we, WALTER H. MILLER, residing at Orange, and ALEXANDER N. PIERMAN, residing at Newark, in the county of Essex and State of New Jersey, citizens of the United States, have invented a certain new and useful Improved Process of Making Sound Records or Blanks, of which the following is a description.

Our invention relates to an improved process for making sound records and blanks, and especially for making cylindrical sound records and blanks having tapered bores.

Although our invention has been designed particularly for making our improved relatively indestructible composite records and blanks described by us in our application for Letters Patent filed on even date herewith, yet there are features of the present process which can be effectively utilized in the manufacture of records and blanks formed wholly of wax or wax-like material.

The object of our present invention, generally speaking, is to provide a process by which molded records or blanks can be expeditiously produced at low cost and of high character.

The invention resides, in the first place, in the process for molding composite records, consisting in first placing within a mold a layer of fibrous material and then flowing into the mold a wax or wax-like material which impregnates the fibrous material. When the record or blank is cylindrical in form, the process also preferably utilizes a tapered core, around which the fibrous material is first lightly wound before its introduction into the mold.

The invention consists, in the second place, of forming molded cylindrical blanks or records, either composite or not, by arranging a tapered core within a mold and introducing a molten wax or wax-like material into the space between the core and mold from the bottom upwardly, so as to expel air and prevent the formation of air-bubbles in the resulting article of manufacture.

The invention consists, in the third place, of molding a cylindrical wax or wax-like record or blank, either composite or not, with an integral molded spiral rib on its interior by flowing a molten wax or wax-like material around a hollow core and within a suitable mold.

The invention further relates to details of procedure connected with the carrying of the process into effect, such as the steps for removing the core from the molded article and for removing the latter from the mold, all as will be hereinafter more fully described and claimed.

In order that the invention may be better understood, attention is directed to the accompanying drawings, forming a part of this specification, and in which—

Figure 1 is a vertical sectional view of a cylindrical mold and tapered core, illustrating a composite cylindrical record formed therein, the parts being in position for the removal of the core; Fig. 2, a sectional view on the line 2 2 of Fig. 1, and Fig. 3 a sectional view showing a dipping-tank containing a wax or wax-like material with a cylindrical mold and tapered core introduced therein and showing the wax or wax-like material filling the space between the core and mold and also filling the hollow core.

In all of the views corresponding parts are represented by the same numerals of reference.

1 represents a tank heated in any suitable way, as by a gas-burner 2, and containing the wax or wax-like material maintained in a molten condition. The level of molten wax-like material is kept approximately constant by adding fresh material when necessary.

3 represents a hollow cylindrical mold. For the manufacture of blanks this mold is smooth on its interior; but for the manufacture of duplicates the mold is provided on its interior with a reverse or negative sound-record obtained in any well-known way.

4 represents a cap which is removably carried by the mold and which prevents material from overflowing the mold in the carrying out of the process, as will be explained.

5 represents a base which carries an integral tapered hollow core 6, formed on its exterior with a spiral groove 7 in order to produce a molded spiral rib in the resulting record or blank. The base 5 is formed with a rim 8, which centers the mold and holds it concentric to the core, and said rim may be formed with grooves 9 therein to facilitate the flow of the molten material beneath the mold when the process is carried out. Engaging the upper end of the core 6 is a light bail 10, which may be removable, if desired, and by means of which the parts are introduced in and lifted from the tank 1. A number of pins 11, headed at both ends, work loosely in the base 5 and support the mold to permit a relative separation of the core and mold when the parts are introduced in the dipping-tank.

In carrying our invention into effect for the manufacture of composite records or blanks of the type described and claimed in our concurrent application we first wind a layer 12 of fibrous material lightly or loosely around the core 6 and of the desired thickness. This fibrous material is preferably ordinary cotton-batting or cotton-wool; but any other suitable fibrous material may be employed—such as cloth, absorbent paper, blotting-paper, paper-pulp, &c. The core, with its loose wrapping of fibrous material, is now inserted into the mold 3 and the cap 4 placed in position. The parts are now introduced in the dipping-tank until the pins 11 rest on the bottom of the tank or on a suitable support therein, thus permitting the core 6 and base 5 to move relatively to said pins and mold and allowing the molten material to enter the space between the core and mold from the bottom upwardly. This molten material seeps through or is absorbed by the fibrous material, driving all air before it until the level of the liquid is reached. The molten material also enters the hollow core, so that the latter is quickly brought to the temperature of the molten liquid, as is also the case with the mold itself, so that when the parts are removed from the dipping-tank there will be no appreciable congealing of the wax or wax-like material either inside of the core or outside of the mold. As soon as the space between the core and mold is completely filled, the parts are removed, the base 5 first engaging the bottom of the mold to thereby act as a valve to prevent the escape of the molten material from the space between the core and the mold. The core and mold are now dipped in cold water, which effects a rapid setting of the wax or wax-like material adjacent to the core, owing to the thinness of the walls of the latter. When the material has sufficiently set, the core is removed by unscrewing it. The blank or record may now be removed from the mold, either by allowing it to remain until it cools sufficiently to shrink away from the mold, permitting its removal, or (and preferably) the mold is inserted in a water-jacket, so as to be quickly cooled, whereby a more rapid radial contraction of the record or blank is effected. After the blank or record has been moved from the mold, its ends are finished in any suitable way, completing the manufacture.

While we have designed our improved process particularly for use in connection with the manufacture of composite records of the type invented by us, it will be understood that our process can be effectively carried out in the manufacture of records or blanks made wholly of wax or wax-like material by merely omitting the preliminary winding of a fibrous material around the core, as explained. We also wish to lay especial stress upon that feature of our process consisting in molding a blank or record around a hollow core having a spiral groove therein, because in this way we are able to successfully mold records or blanks having an integral internal spiral rib and to remove the core from the finished article without injuring the latter. If the attempt were made to cast or mold a record or blank around a solid tapered core, the considerable mass of the latter, with its relatively low radiating capacity, would prevent the successful formation of a molded spiral rib of this character.

Having now described our invention, what we claim as new, and desire to secure by Letters Patent, is as follows:

1. The method of forming phonograph-tablets, that consists of molding a mass of molten record material which is normally hard and friable, throughout and around a mass of loose fibrous material, substantially as set forth.

2. The method of forming phonograph-tablets, that consists of molding a mass of molten record material which is normally hard and friable, throughout and around a loose mass of cotton-wool, substantially as set forth.

3. The process for making composite sound records or blanks which consists in introducing a layer of fibrous absorbent material in a mold, and in flowing therein a molten hard, friable wax or wax-like material to impregnate the fibrous material, substantially as and for the purposes set forth.

4. The process for making composite sound records or blanks which consists in introducing a layer of fibrous absorbent material in a cylindrical mold, and in flowing a hard, friable wax or wax-like material therein to impregnate the fibrous material, substantially as and for the purposes set forth.

5. The process for making composite sound records or blanks which consists in introducing a layer of fibrous absorbent material in a cylindrical mold and around a tapered core therein, and in introducing a molten hard, friable wax or wax-like material into the space between the core and mold to impregnate the fibrous material, substantially as and for the purposes set forth.

6. The process for making composite sound records or blanks which consists in introducing a layer of cotton-wool in a mold, and introducing a molten hard, friable wax or wax-like material therein to impregnate the cotton-wool, substantially as and for the purposes set forth.

7. The process for making composite sound records or blanks which consists in introducing a layer of cotton-wool in a cylindrical mold and around a tapered core, and in introducing a molten hard, friable wax or wax-like material into the space between said mold and core to impregnate the cotton-wool, substantially as and for the purposes set forth.

8. The process for making sound records or blanks which consists in casting a record or blank around a hollow tapered core having a spiral groove therein, and in simultaneously introducing molten material within said core, substantially as and for the purposes set forth.

9. The process for making sound records or blanks which consists in casting a molten wax or wax-like material within a mold and around a hollow tapered core having a spiral groove therein, and in simultaneously introducing the molten wax or wax-like material within said core, substantially as and for the purposes set forth.

10. The process for making composite sound records or blanks which consists in first lightly wrapping a fibrous absorbent material around a tapered core, then in introducing the core and fibrous material in a cylindrical mold, and finally in introducing a molten hard, friable wax or wax-like material into the space between the core and mold to impregnate the fibrous material, substantially as and for the purposes set forth.

11. The process for making composite sound records or blanks which consists in first lightly wrapping a fibrous absorbent material around a tapered core, then in introducing the core and fibrous material in a cylindrical mold, and finally in introducing a molten hard, friable wax or wax-like material into the space between the core and mold to impregnate the fibrous material, the molten material being introduced from the bottom upwardly, substantially as and for the purposes set forth.

This specification signed and witnessed this 19th day of November, 1902, and this 31st day of October, 1902, respectively.

WALTER H. MILLER.
  ALEXANDER N. PIERMAN.

Witnesses to signature of Walter H. Miller:
  HARRY F. MILLER,
  S. S. BROWN.

Witnesses to signature of Alexander N. Pierman:
  W. J. BUEHLER,
  W. PUGH.